US012736642B2

(12) United States Patent
Peter

(10) Patent No.: US 12,736,642 B2
(45) Date of Patent: Sep. 15, 2026

(54) METHOD AND DEVICE FOR DETERMINING FALSE-POSITIVE DETECTIONS OF A LIDAR SENSOR

(71) Applicant: MERCEDES-BENZ GROUP AG, Stuttgart (DE)

(72) Inventor: David Peter, Stuttgart (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 791 days.

(21) Appl. No.: 18/027,175

(22) PCT Filed: Jul. 26, 2021

(86) PCT No.: PCT/EP2021/070888
§ 371 (c)(1),
(2) Date: Mar. 20, 2023

(87) PCT Pub. No.: WO2022/058076
PCT Pub. Date: Mar. 24, 2022

(65) Prior Publication Data

US 2023/0366994 A1 Nov. 16, 2023

(30) Foreign Application Priority Data

Sep. 21, 2020 (DE) .................... 10 2020 005 755.1

(51) Int. Cl.
*G01S 7/487* (2006.01)
*G01S 17/931* (2020.01)
(Continued)

(52) U.S. Cl.
CPC .......... *G01S 7/4876* (2013.01); *G01S 17/931* (2020.01); *B60W 2420/408* (2024.01); *G01S 7/4802* (2013.01); *G01S 17/42* (2013.01)

(58) Field of Classification Search
USPC .......................................................... 702/189
See application file for complete search history.

(56) References Cited

U.S. PATENT DOCUMENTS 6,323,802 B1 11/2001 Tokoro
9,354,318 B1 5/2016 Beard et al.
(Continued)

FOREIGN PATENT DOCUMENTS

DE 19947593 A1 5/2000
DE 102018125715 A1 4/2020
(Continued)

OTHER PUBLICATIONS

Japanese Notice of Reasons for Refusal mailed Nov. 14, 2023, for corresponding/related Japanese Application No. 2023-518140, including English translation (8 pages).
(Continued)

*Primary Examiner* — Paul D Lee
(74) *Attorney, Agent, or Firm* — PATENT PORTFOLIO BUILDERS PLLC

(57) ABSTRACT

A method for determining false-positive detections of a lidar sensor in a scanning process of the surroundings of a vehicle involves, for every laser pulse that is reflected back to the lidar sensor in a scan range of this, checking whether this is reflected back several times in different distances. First reflections of a laser pulse that is reflected back several times are clustered and then, if a distance evaluation of reflections from the cluster produced reveals that the laser pulses are being reflected at a reflecting surface that is at least approximately homogeneous, further reflections following the respective first reflection are marked as false-positive detections.

10 Claims, 7 Drawing Sheets

Figure 1:
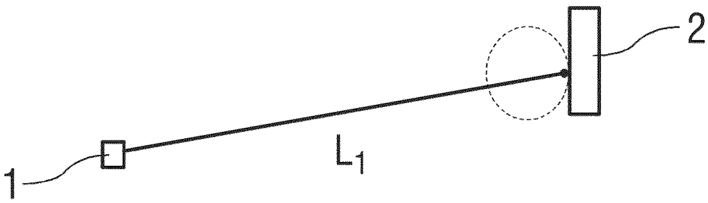

(51) Int. Cl.
*G01S 7/48* (2006.01)
*G01S 17/42* (2006.01)

(56) References Cited

U.S. PATENT DOCUMENTS

| | | | | |
|---|---|---|---|---|
| 9,921,153 | B2 | 3/2018 | Wegner et al. | |
| 10,629,072 | B2 * | 4/2020 | Felix | G06V 20/58 |
| 11,500,075 | B2 * | 11/2022 | Bhaskaran | G01S 7/4815 |
| 2010/0034426 | A1 | 2/2010 | Takiguchi et al. | |
| 2016/0178802 | A1 * | 6/2016 | Stainvas Olshansky | G01S 17/95 356/445 |
| 2017/0023473 | A1 | 1/2017 | Wegner et al. | |
| 2019/0041522 | A1 * | 2/2019 | Slutsky | G01S 7/4816 |
| 2019/0293793 | A1 | 9/2019 | Okuya | |
| 2020/0346653 | A1 | 11/2020 | Kondo et al. | |
| 2021/0103055 | A1 * | 4/2021 | Allen | G01S 17/10 |
| 2022/0003871 | A1 | 1/2022 | Troeger et al. | |

FOREIGN PATENT DOCUMENTS

| | | | |
|---|---|---|---|
| EP | 3121620 | A1 | 1/2017 |
| JP | 2006177858 | A | 7/2006 |
| JP | 2009036540 | A | 2/2009 |
| JP | 2009042177 | A | 2/2009 |
| JP | 2009075117 | A | 4/2009 |
| JP | 2014119285 | A | 6/2014 |
| JP | 2018066679 | A | 4/2018 |
| JP | 2019015706 | A | 1/2019 |
| JP | 2019124623 | A | 7/2019 |

OTHER PUBLICATIONS

International Search Report and Written Opinion mailed Nov. 9, 2021 in related/corresponding International Application No. PCT/EP2021/070888.

Koch et al.; "Effective Distinction of Transparent and Specular Reflective Objects in Point Clouds of a Multi-Echo Laser Scanner;" Proceedings of the 2017 18th International Conference on Advanced Robotics (ICAR), Jul. 2017 Hong Kong, CN.

Office Action created Aug. 12, 2021 in related/corresponding DE Application No. 10 2020 005 755.1.

Rusu et al.; "3D is here: Point Cloud Library (PCL);"2011 IEEE International Conference on Robotics and Automation; Aug. 18, 2011; Shanghai, CN.

Schlichting et al.; "Vehicle Localization By Lidar Point Correlation Improved By Change Detection;" The International Archives of the Photogrammetry, Remote Sensing and Spatial Information Sciences; Jul. 12-19, 2016; vol. XLI-B1, 2016 XXIII ISPRS Congress; Prague, CZ.

Office Action dated Jul. 22, 2025 in related/corresponding KR Application No. 10-2023-7009210.

* cited by examiner 3
2
C1
R2
R1
1

METHOD AND DEVICE FOR DETERMINING FALSE-POSITIVE DETECTIONS OF A LIDAR SENSOR

BACKGROUND AND SUMMARY OF THE INVENTION

Exemplary embodiments of the invention relate to a method for determining false-positive detections of a lidar sensor in a scanning process of the surroundings of a vehicle, as well as to a device for determining false-positive detections of a lidar sensor in a scanning process of the surroundings of a vehicle.

A radar apparatus for a vehicle, which is to be mounted on a vehicle, is known from DE 199 47 593 A1. The radar apparatus has a radar beam scanning device for scanning a scan range, with a radar beam parallel to a road surface on which the vehicle is driving. Furthermore, the radar apparatus has an object detecting device for receiving reflected waves of the radar beam for generating a detected picture of an object, based on the reflected waves, wherein the object detecting device comprises a phantom response determining device for determining whether a generated detected picture of an object is a phantom response.

Exemplary embodiments of the invention are directed to a novel method and a novel device for determining false-positive detections of a lidar sensor.

In the method for determining false-positive detections of a lidar sensor in a scanning process of the surroundings of a vehicle, for every laser pulse that is reflected back to the lidar sensor in a scan range of this, it is, according to the invention, checked whether this is reflected back several times in different distances. Furthermore, first reflections of a laser pulse that is reflected back several times are clustered. If a distance evaluation of reflections from the cluster produced reveals that the laser pulses are being reflected at a reflecting surface that is at least approximately homogeneous, then further reflections following the respective first reflection are marked as false-positive detections.

By means of the method, a determination of false-positive detections, also referred to as phantom targets or phantom responses, of a lidar in a scanning process of the surroundings of a vehicle can be realized in reliable manner. It is thus possible to avoid serious restrictions of a lidar in real traffic scenes that result from reflective materials, such as, for example, window panes of other vehicles. A reliability of an operation of driver assistance systems, in particular also of automated, in particular highly automated or autonomously driving vehicles, can thus be increased.

In a possible embodiment of the method, additionally, the further reflections are then only marked as false-positive detections if the further reflections of the cluster occur at a larger distance than the first reflection. This leads to a further increase of the reliability of the determination of false-positive detections.

In a further possible embodiment of the method, in an investigation, the surface of the clusters between clusters with planar surfaces, clusters with curved surfaces, clusters that extend in exactly one spatial direction, and clusters that extend in three spatial directions, is differentiated. Based on this differentiation, a classification of the clusters is possible in such a way that a decision can be made in a simple way based on the classification as to whether the presence of a false-positive detection in this cluster is possible.

In a further possible embodiment of the method, exclusively clusters with planar surfaces, and clusters with a slightly curved surface, are characterized as approximately homogeneous reflecting surfaces.

In a further possible embodiment of the method, clusters that extend in exactly one spatial direction are characterized as clusters representing edges of objects.

In a further possible embodiment of the method, clusters that extend in three spatial directions are characterized as clusters representing dust and/or fog and/or fine-grained structures.

The device for determining false-positive detections of a lidar in a scanning process of the surroundings of a vehicle comprises, according to the invention, an evaluation unit, which is formed

- to check for every laser pulse that is reflected back to the lidar in a scan range of this, whether this is reflected back several times in different distances,
- to cluster first reflections of a laser pulse that is reflected back several times, and
- then, if a distance evaluation of reflections from the cluster produced reveals that the laser pulses are being reflected at a reflecting surface that is at least approximately homogeneous, to mark further reflections following the respective first reflection as false-positive detections.

The device enables a determining of false-positive detections of a lidar sensor in a scanning process of the surroundings of a vehicle in a reliable way. It is thus possible to avoid serious restrictions of a lidar sensor in real traffic scenes which result from reflective materials, such as, for example, window panes of other vehicles. A reliability of an operation of driver assistance systems, in particular also of automated, in particular highly automated or autonomously driving vehicles, can thus be increased.

Exemplary embodiments of the invention are explained in greater detail below by means of drawings.

BRIEF DESCRIPTION OF THE DRAWING FIGURES

Figure 2:
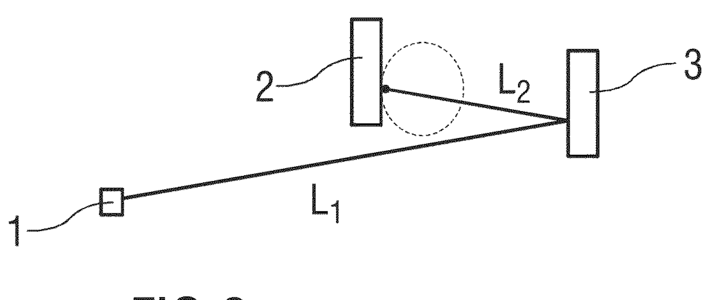
Figure 3:
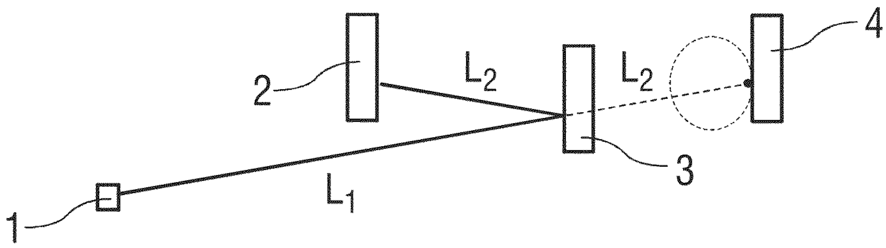
Figure 4:
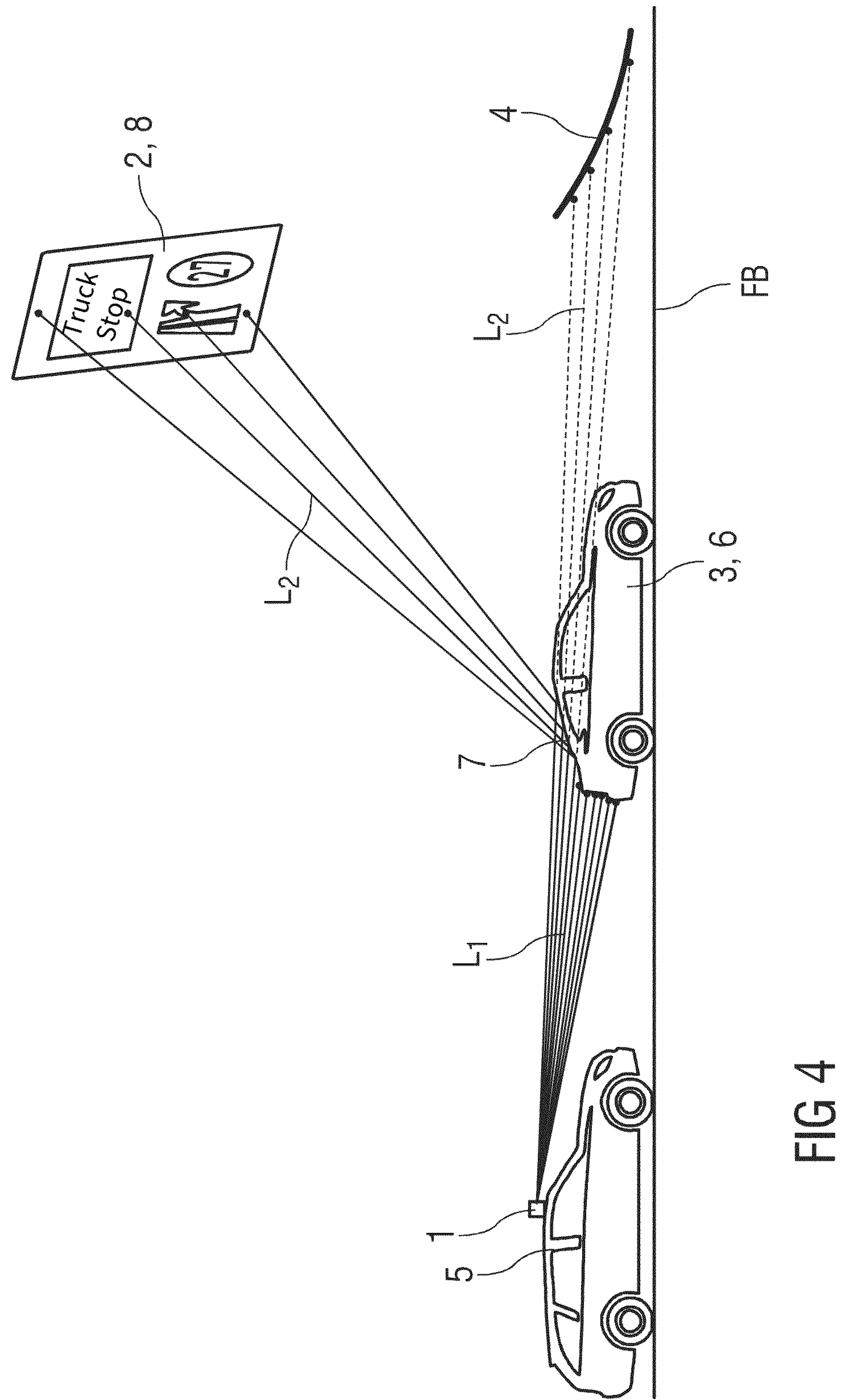
Figure 5:
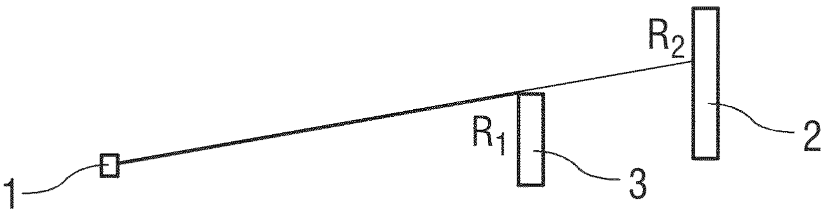
Figure 6:
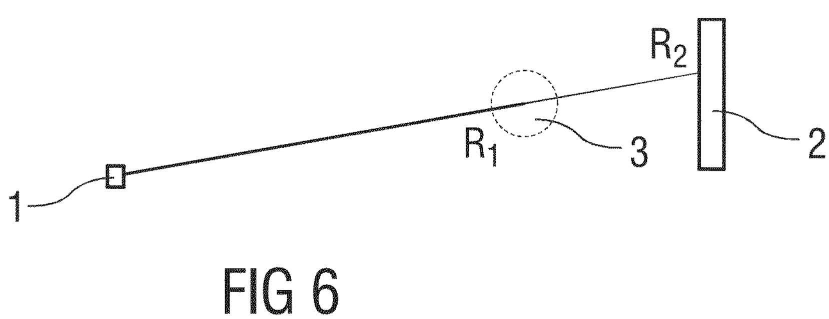
Figure 7:
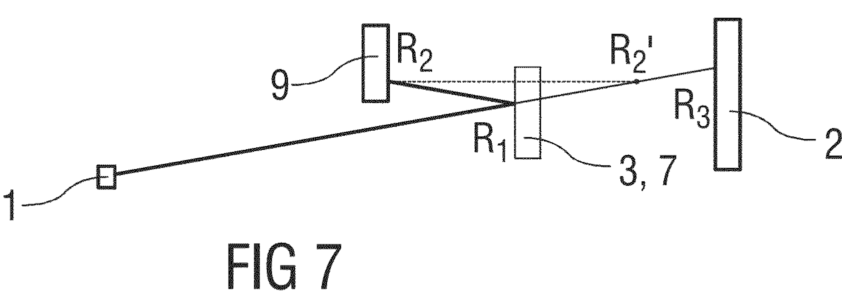
Figure 8:
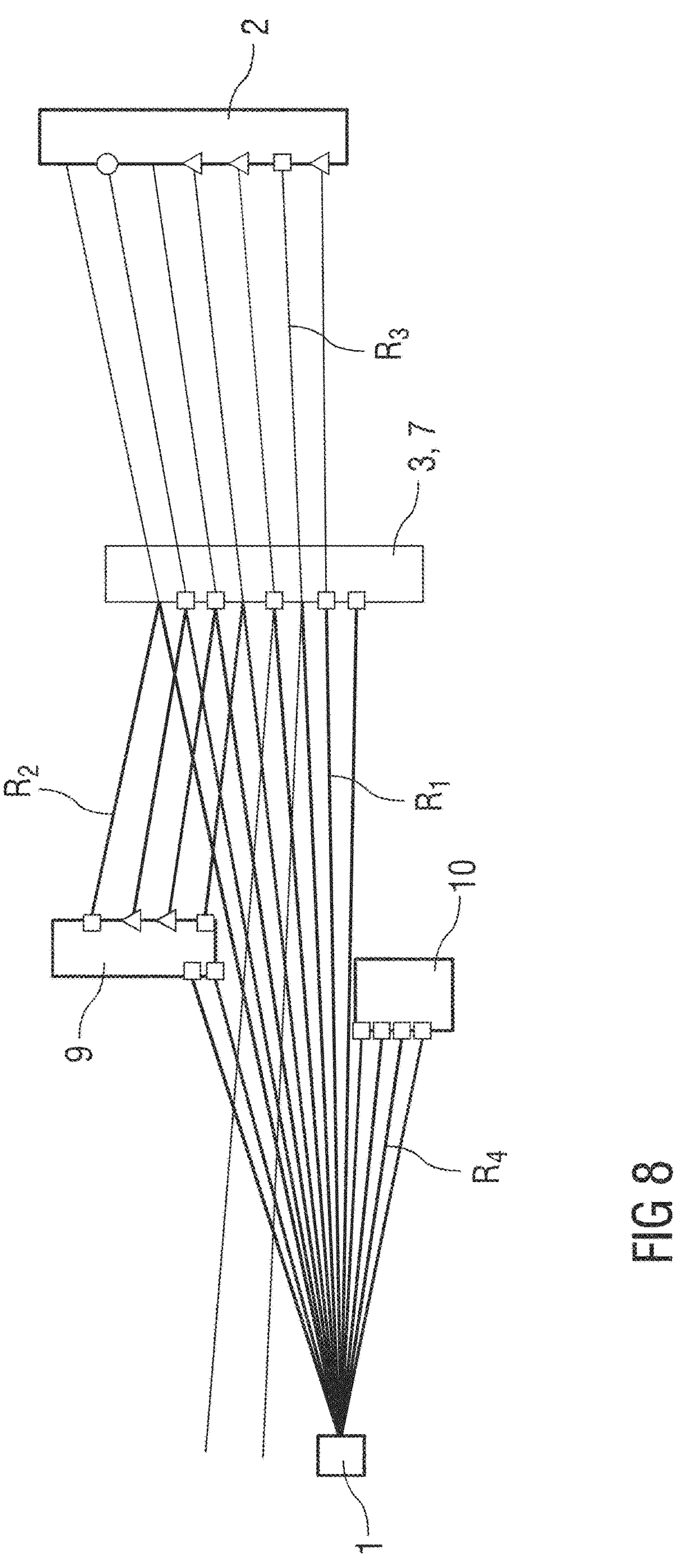
Figure 9:
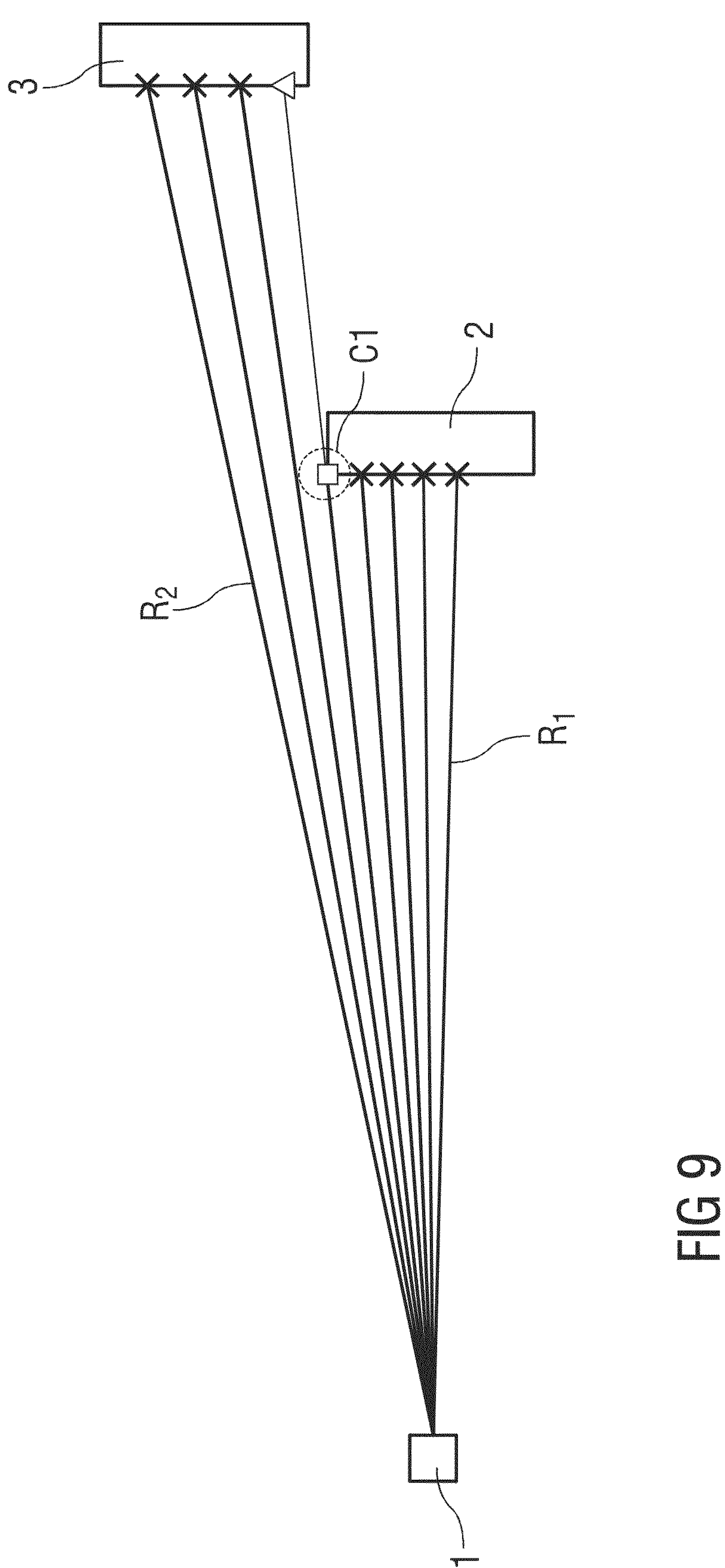
Figure 10:
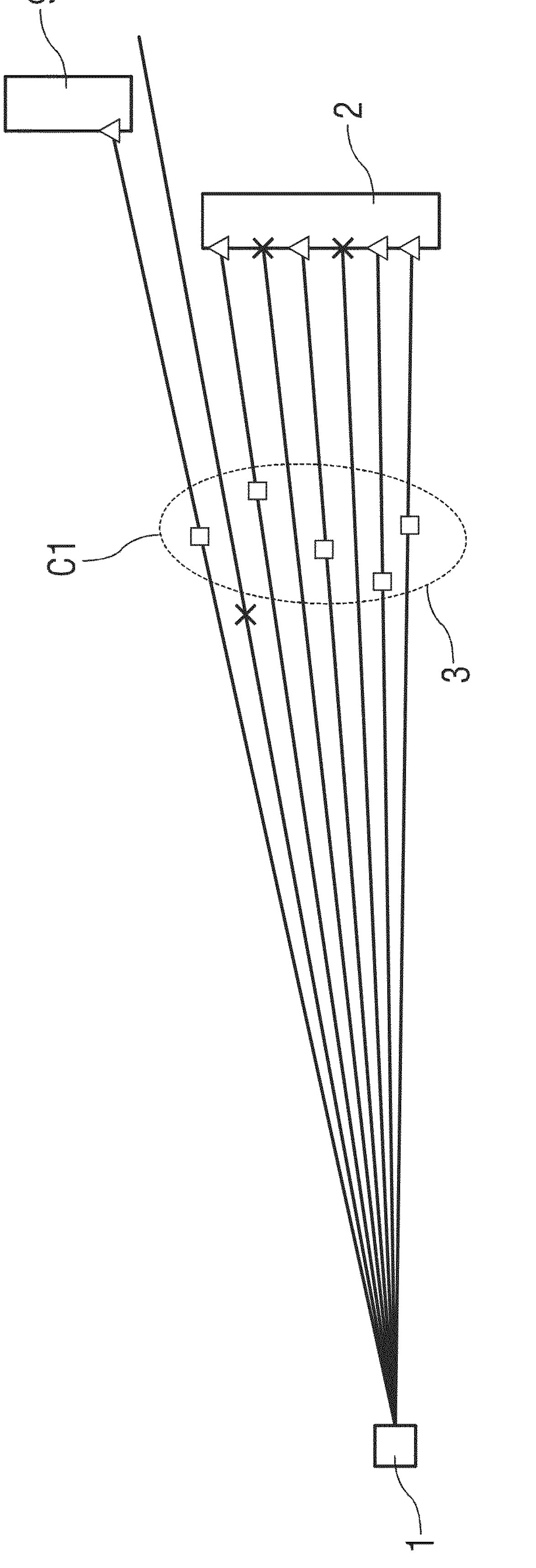
Figure 11:
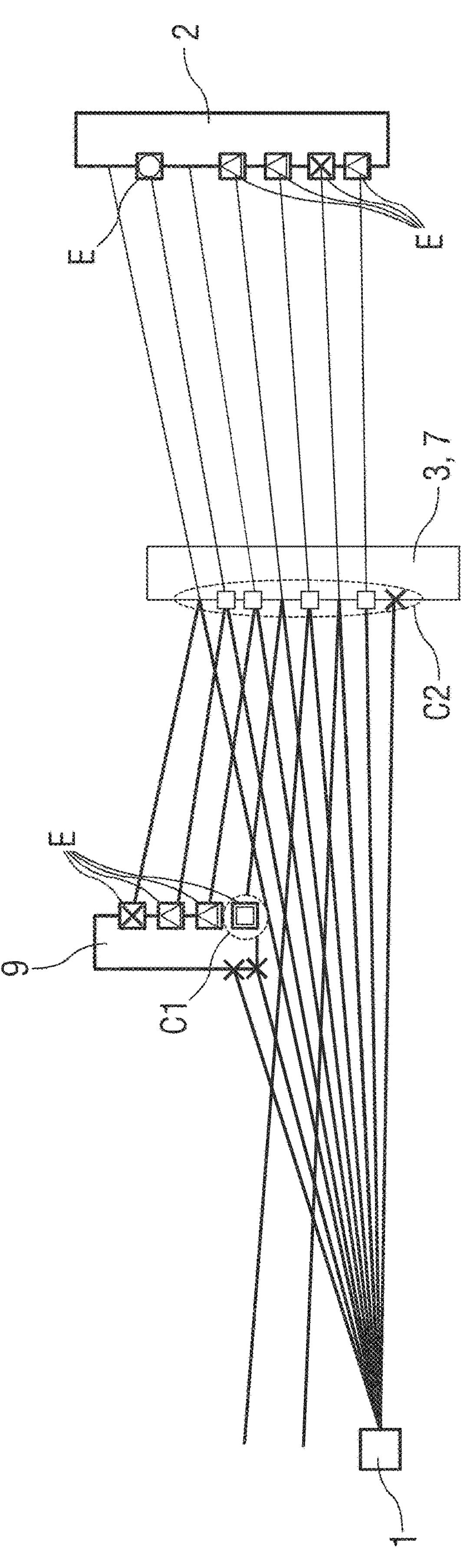

Here are shown:

FIG. 1 a schematic view of a lidar sensor, an object, and a trajectory of laser beams at a diffuse reflection from the object, FIG. 2 a schematic view of a lidar sensor, two objects and a trajectory of laser beams at a mirror-like reflection from one of the objects and a diffuse reflection from the other object, FIG. 3 a schematic view of a lidar sensor, two objects and a phantom object, as well as a trajectory of laser beams, FIG. 4 a schematic view of a traffic scenario, FIG. 5 a schematic view of a lidar sensor, two objects and a trajectory of reflected laser pulses, FIG. 6 a schematic view of a lidar sensor, an object, and a trajectory of reflected laser pulses when there is dust or fog between the lidar sensor and the object, FIG. 7 a schematic view of a lidar sensor, a partially transmissive object, two non-transmissive objects, and a trajectory of reflected laser pulses, FIG. 8 a schematic view of a lidar sensor, a partially transmissive object, three non-transmissive objects, and a trajectory of reflected laser pulses, FIG. 9 a schematic view of a lidar sensor, two objects, and a trajectory of reflected laser pulses, FIG. 10 a schematic view of a lidar sensor, two objects, a further object formed by dust and/or fog, and a trajectory of reflected laser pulses, and FIG. 11 a schematic view of a lidar sensor, a partially transmissive object, two non-transmissive objects, and a trajectory of reflected laser pulses.

Parts that correspond to one another are provided with the same reference numerals in all figures.

DETAILED DESCRIPTION

In FIG. 1, a lidar sensor 1, an object 2, and a trajectory of laser beams $L_1$, $L_2$ at a diffuse reflection from the object 2 are shown.

Lidar sensors 1 are very important for vehicles 5 and their driver assistance systems in an assessment of the surroundings of a vehicle, as depicted in more detail in FIG. 4, for example for automated, in particular highly automated or autonomously driving vehicles 5, since a precise, three-dimensional understanding of a traffic scene surrounding the vehicle 5 is possible by means of lidar sensors 1. In order to be employed in such a safety-critical scenario, it is however crucial to determine false-positive detections or false-positive distance measurements of the lidar sensors shown in FIG. 11. Failure to detect such false-positive detections can lead to dangerous automated interventions in a longitudinal and/or lateral guidance of the vehicle 5, from which dangerous situations, for example unwarranted emergency braking, can result.

Lidar sensors 1 are generally characterized by very small false-positive rates, i.e., low noise levels. For most target materials, the incident laser beams $L_1$, $L_2$ are reflected diffusely, i.e., in all possible directions. This means that a part of the light is reflected directly back into the lidar sensor 1, which enables a precise distance measurement.

A mirror reflection can, however, dominate on strongly reflective surfaces. This is depicted in more detail in FIG. 2, wherein FIG. 2 shows a lidar sensor 1, two objects 2, 3, and a trajectory of laser beams $L_1$, $L_2$ at a mirror-like reflection from one of the objects 3 and a diffuse reflection from the other object 2.

Here, the laser beams $L_1$ from the lidar sensor 1 are deflected away, where these, as laser beams $L_2$, can potentially hit other, non-mirror-like reflective surfaces, such as, for example, the object 2. The lidar sensor 1 thereby does not measure a distance of the laser beams $L_1$ to the surface of the object 3, but rather a total length of a zigzag path of both laser beams $L_1$, $L_2$.

The lidar sensor 1 thereby has no information indicating that the laser beams $L_2$ were deflected, so that a distance measurement along a straight line is assumed. A false-positive detection thus occurs along an initial sending direction along the laser beams $L_1$, from which results a detection of a phantom object 4 shown in FIG. 3.

This represents a fundamental problem, which can lead to critical faults if left unchecked. In real traffic scenes, highly mirror-like reflective surfaces frequently appear in the form of window panes 7 of other vehicles 6 (represented in FIG. 4). Even if these do not reflect in a perfectly mirrored way, they however deflect at least a part of the incident laser beams L1. If the deflected laser beams L2 then hit a strongly reflective secondary object 2, for example a traffic sign 8, an indirect path resulting from this can dominate a direct path, for example formed by a diffuse reflection at the window pane of a vehicle.

Such a situation is exemplarily represented in FIG. 4. FIG. 4 thereby shows a traffic scenario with a vehicle 5 that has a lidar sensor 1, an object 3 situated in front of this that is formed as a further vehicle 6, a further object 2 that is formed as a traffic sign 8 and a phantom object 4.

Here, such a phantom object 4 appears to be on a road FB in front of the vehicle 5. Such false-positive detections can be consistent across longer time periods, but can also have an unusual dynamic, since an exact position depends on a relative distance between the two vehicles 5, 6 and a distance between a primary and a secondary target, for example the window pane 7 and the traffic sign 8. If reflection effects of this kind are not recognized, there is the danger that a driver assistance system or a system for automated driving of the vehicle 5 reacts to the phantom object 4, and initiates a false intervention in a longitudinal and/or lateral control of the vehicle 5, for example an emergency braking or an evasive maneuver.

In order to enable a detection of such reflection effects and consequently a reliable detection of phantom objects, a determination of false-positive detections of a lidar sensor 1 in a scanning process of the surroundings of a vehicle is provided, which is described using the following FIGS. 5 to 11.

Here, FIG. 5 shows a lidar sensor 1 and two objects 2, 3 if the object 3 situated between the object 2 and the lidar sensor 1 is only partially hit by laser beams $L_1$ emitted by means of the lidar sensor 1. Two reflected laser pulses $R_1$, $R_2$ are thereby created.

In FIG. 6, a lidar sensor 1, an object 2, and a further object 3 formed by dust and/or fog between the lidar sensor 1 and the object 2 are represented. Due to the dust and/or fog, two reflected laser pulses $R_1$, $R_2$ are also created.

FIG. 7 shows a lidar sensor 1, a partially transmissive object 3, for example a window pane 7 of a vehicle 6, two non-transmissive objects 2, 9.

The kind of partially transmissive objects 3, for example glass windows, can lead to three different distance measurements. Here, there can, for example, be a direct diffuse reflection of defective and possibly dirty window panes 7, as is represented by the reflected laser pulse $R_1$.

There can also be a mirror reflection on the glass surface, which can lead to phantom reflections, represented by the reflected laser pulses $R_2$, $R_2'$. In particular, the reflected laser pulse $R_2$ is registered as a false-positive laser pulse $R_2'$ along the original beam direction.

Further, the transmission through the glass and a diffuse reflection onto the object 2 formed as a background object can lead to a reflected laser pulse $R_3$.

In an embodiment that is not depicted in more detail, a length of the reflected laser pulse $R_2$ can also be longer than a length of the reflected laser pulse $R_3$. However, the direct diffuse reflection, represented by the reflected laser pulse $R_1$, is always the first reflection received, with the shortest distance.

In exemplary embodiments that are not depicted in more detail, other beam paths are also possible, for example a reflection from a back side of the window pane 7 after hitting the object 2 formed as a background object, which are however of a higher order and significantly weaker.

In order to recognize false-positive detections, like, for example, the reflected laser pulse $R_2'$, it is necessary to initially distinguish between the scenarios represented in FIGS. 5 and 6. Such a differentiation is complicated by that fact that not every laser beam leads to a weak direct reflection as per the laser pulse $R_1$ reflected at the window pane 7 in the scenario represented in FIG. 7.

FIG. 8 shows this difficulty in more detail using a more complex scene. In this case, FIG. 8 shows a lidar sensor 1, a partially transmissive object 3, three non-transmissive objects 2, 9, 10, and a trajectory of reflected laser pulses $R_1$ to $R_4$.

A direct diffuse reflection at the transmissive object 3, for example the window pane 7 of the vehicle 6, leads to a small number of first reflections on a surface of the object 3, wherein the first reflections are represented by means of squares.

For some laser beams, the mirror reflection at the object 3 predominates, for others the transmissive path at the object 3 predominates, so that reflections at the objects 2 and 9 are produced. In some cases, a passage of the laser beams through the object 3 thereby occurs in such a way that first reflections first occur at the objects 2 and 9.

Furthermore, second reflections of a laser beam are represented as triangles and third reflections as circles.

In order to determine false-positive detections in the measurements, it is provided that the complete scanning process carried out by means of the lidar sensor 1 is scanned for measurements with second and possibly higher reflections.

Subsequently, a simple Euclidean clustering algorithm is applied for all first reflections that are represented as squares in the FIGS. 9 to 11, in order to combine nearby points.

For every expanded cluster C1, C2 formed in this manner, a principal component analysis is carried out, which leads to three sorted eigenvalues $\lambda 1 \geq \lambda 2 \geq \lambda 3$. Clusters C1, C2 are depicted in more detail in FIGS. 9 to 11.

Planar cluster C1, C2 with $\lambda 1$, $\lambda 2 >> \lambda\lambda 3$ and cluster C1, C2 with slightly curved surfaces are marked as potential reflective surfaces. Clusters C1, C2 which, however, only extend in one direction ($\lambda 1 >> \lambda 2$, $\lambda 3$) most likely result from object edges and are therefore not marked. Clusters C1, C2 which extend in all directions ($\lambda 1 \approx \lambda 2 \approx \lambda 3$) most likely result from fog and/or dust and/or from very fine-grained structures, for example trees or vegetation, and are also not marked.

The measurements that fulfil the following two conditions are marked as false-positive reflections or detections E:

1. The reflection arises from a measurement along a laser beam, which runs through a space spanned by a marked cluster C1, C2 (represented in FIGS. 9 to 11 by dashed outlines of the first reflections).
2. A distance to the reflection is greater than a distance to the marked cluster C1; i.e., the reflection is situated behind the cluster C1, C2 as seen from the lidar sensor.

FIG. 9 shows a lidar sensor 1, two objects 2, 3, and a trajectory of reflected laser pulses $R_1$, $R_2$. Here, a laser beam is partially reflected at an edge of the object 2, wherein the remaining part is reflected at the further object. Here, the reflection at the edge of the object 2 represents a first reflection, the reflection at the further object 3 represents a second reflection. Since there is no extended region with second reflections, only one cluster C1 in the area of the first reflection is marked. The remaining reflections (represented by crosses), after which no further reflections follow, are not marked.

In FIG. 10, a lidar sensor 1, two objects 2, 9, and a further object 3 formed from dust and/or fog between the lidar sensor 1 and the objects 2, 9 are represented. All reflections (represented as squares), after which further reflections (represented as triangles) follow, are combined into one cluster C1.

In FIG. 11, a lidar sensor 1 and three objects 2, 3 and 9 are represented, wherein an object 3 is formed to be transmissive, for example as the window pane 7 of a vehicle 6. All reflections (represented as squares) after which further reflections (represented as triangles) follow, are combined into the clusters C1, C2. Here, the cluster C2 has a planar surface and is therefore marked. For all laser beams that pass through the space spanned by the cluster C2, associated reflections are marked as false-positive detections E.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. A method comprising:

emitting, by a lidar sensor of a vehicle, a plurality of laser pulses in different directions in a scanning operation of an environment of the vehicle;

receiving, by the lidar sensor, laser pulse reflections of the emitted plurality of laser pulses;

checking every laser pulse reflection in a scan range of the lidar sensor to determine whether the laser pulse is reflected back several times in different distances;

forming a cluster of first reflections of the laser pulse that are reflected back several times; and then marking further reflections following the first reflections of the laser pulse as false-positive detections if a distance evaluation of laser pulses reflected at the cluster indicates that the laser pulse is being reflected at a reflecting surface that is planar or is a curved window pane of another vehicle; and controlling, by a driver assistance system of the vehicle, longitudinal or lateral movement of the vehicle based on the first reflections and omitting the marked further reflections.

2. The method of claim 1, wherein the further reflections are then only marked as false-positive detections if the further reflections from the reflecting surface of the cluster occur at a larger distance than the first reflections.

3. The method of claim 1, further comprising:

differentiating a surface of the cluster between a cluster with the planar surface, a cluster with the curved window pane, a cluster extending in exactly one spatial direction, and a cluster extending in three spatial directions.

4. The method of claim 3, wherein the cluster extending in exactly one spatial direction is characterized as a cluster representing edges of an object.

5. The method of claim 3, wherein the cluster extending in the three spatial directions is characterized as a cluster representing dust, fog, or fine-grained structures.

6. A vehicle comprising:

a lidar sensor configured to emit a plurality of laser pulses in different directions in a scanning operation of an environment of the vehicle and receive laser pulse reflections of the emitted plurality of laser pulses;

a device, coupled to the lidar sensor, configured to check every laser pulse reflection in a scan range of the lidar sensor to determine whether the laser pulse is reflected back several times in different distances;

form a cluster of first reflections of the laser pulse that are reflected back several times; and then mark further reflections following the first reflections of the laser pulse as false-positive detections if a distance evaluation of laser pulses reflected at the cluster indicates that the laser pulse is being reflected at a reflecting surface that is planar or is a curved window pane of another vehicle; and a driver assistance system, coupled to the device, configured to control longitudinal or lateral movement of the vehicle based on the first reflections and omitting the marked further reflections.

7. The vehicle of claim 6, wherein the device is configured to only mark the further reflections as false-positive detections if the further reflections from the reflecting surface of the cluster occur at a larger distance than the first reflections.

8. The vehicle of claim 6, wherein the device is further configured to differentiate a surface of the cluster between a cluster with the planar surface, a cluster with the curved window pane, a cluster extending in exactly one spatial direction, and a cluster extending in three spatial directions.

9. The vehicle of claim 8, wherein the cluster extending in exactly one spatial direction is characterized as a cluster representing edges of an object.

10. The vehicle of claim 8, wherein the cluster extending in the three spatial directions is characterized as a cluster representing dust, fog, or fine-grained structures.

* * * * *